United States Patent
Ilo

(10) Patent No.: US 10,348,091 B2
(45) Date of Patent: Jul. 9, 2019

(54) METHOD FOR OPERATING AN ENTIRE ENERGY SUPPLY NETWORK IN AN ENERGY GENERATION DECENTRALIZED MANNER

(71) Applicant: Siemens Aktiengesellschaft, Munich (DE)

(72) Inventor: Albana Ilo, Pressbaum (AT)

(73) Assignee: Siemens Aktiengesellschaft, Munich (DE)

( * ) Notice: Subject to any disclaimer, the term of this patent is extended or adjusted under 35 U.S.C. 154(b) by 390 days.

(21) Appl. No.: 14/781,514

(22) PCT Filed: Apr. 9, 2013

(86) PCT No.: PCT/EP2013/057360
§ 371 (c)(1),
(2) Date: Sep. 30, 2015

(87) PCT Pub. No.: WO2014/166524
PCT Pub. Date: Oct. 16, 2014

(65) Prior Publication Data
US 2016/0056631 A1    Feb. 25, 2016

(51) Int. Cl.
*H02J 3/38* (2006.01)
*G05B 15/02* (2006.01)
*H02J 3/04* (2006.01)

(52) U.S. Cl.
CPC ............. *H02J 3/38* (2013.01); *G05B 15/02* (2013.01); *H02J 3/04* (2013.01); *Y02E 60/721* (2013.01); *Y04S 10/126* (2013.01)

(58) Field of Classification Search
CPC .... H02J 3/38; H02J 3/04; G05B 15/02; Y02E 60/721; Y04S 10/126

(Continued)

(56) References Cited

U.S. PATENT DOCUMENTS

| 2004/0010350 A1 | 1/2004 | Lof et al. |
| 2010/0145532 A1* | 6/2010 | Gregory ............... H02J 3/383 700/286 |

(Continued)

FOREIGN PATENT DOCUMENTS

| EP | 2463980 A | 6/2012 |
| WO | WO 2014/067557 | 5/2014 |

OTHER PUBLICATIONS

Office Action dated Nov. 24, 2016 which issued in the corresponding European Patent Application No. 13717741.6.

(Continued)

*Primary Examiner* — Robert E Fennema
*Assistant Examiner* — Jigneshkumar C Patel
(74) *Attorney, Agent, or Firm* — Cozen O'Connor

(57) ABSTRACT

A method for operating an energy supply network, wherein energy generation is decentralized, the energy supply network has three supply levels, and energy is generated in each supply level and is fed into the particular supply level, where the three supply levels each form an independent control unit that is connectable or disconnectable via interfaces between the control units as needed, an operator region is associated with each of the control units, in which operator region an energy feed-in and an energy consumption for the respective associated control unit are combined and controlled, and where an exchange of energy amounts between the control units is then controlled, such as in a demand-oriented manner, by the respective operator areas via the interfaces between associated control units by the control of parameters defined between the control units, such that the entire energy supply network can be dynamically controlled in a simple manner.

11 Claims, 2 Drawing Sheets

(58) Field of Classification Search
USPC .......................................................... 700/287
See application file for complete search history.

(56) References Cited

U.S. PATENT DOCUMENTS

| | | | |
|---|---|---|---|
| 2011/0316337 A1* | 12/2011 | Pelio .................... | H05K 7/1492 307/24 |
| 2012/0029720 A1* | 2/2012 | Cherian ................. | H02J 13/00 700/297 |
| 2012/0150358 A1* | 6/2012 | Beck ....................... | H02J 3/16 700/287 |
| 2012/0166002 A1* | 6/2012 | Kim ........................ | H02J 3/14 700/291 |
| 2012/0223577 A1* | 9/2012 | Beck ....................... | H02J 3/16 307/18 |

OTHER PUBLICATIONS

Baalbergen F. et al. "Outline of a New Hierarchical Agent-Based Voltage Instability Protection System," IEEE Transmission and Distribution Conference and Exposition, 2010, 8 pages.
Office Action dated Dec. 1, 2018 issued in Indian Patent Application No. 8821/DELNP/2015.

* cited by examiner

METHOD FOR OPERATING AN ENTIRE ENERGY SUPPLY NETWORK IN AN ENERGY GENERATION DECENTRALIZED MANNER

CROSS-REFERENCE TO RELATED APPLICATIONS

This is a U.S. national stage of application No. PCT/EP2013/057360 filed Apr. 9, 2013.

BACKGROUND OF THE INVENTION

1. Field of the Invention

The invention relates generally to the field of energy generation, energy supply and energy management and, more particularly, to a method for operating an entire energy supply network, where energy generation is decentralized and the energy supply network has three supply levels, where energy is generated at each supply level and fed into the respective supply level.

2. Description of the Related Art

During recent years, energy supply networks for the transmission and distribution of electrical energy have undergone considerable change with respect to their composition. Here, an energy supply network is normally understood to mean a network of electrical lines in which physical processes can be described by Kirchhoff's rules. In an energy supply network of traditional composition, electrical energy is transmitted from a small number of centralized large generators (e.g., conventional power plant operators, etc.) to a multiplicity of end users or subscribers (e.g., firms or households) who obtain energy from the energy supply network. Therefore, a transmission direction for the electrical energy is essentially predetermined, i.e., from the large generators (as source) to the individual end users (as destination).

For the purpose of transporting the energy, provision is usually made for three supply levels in an energy supply network, the supply levels essentially being networks or network levels having different specified voltage ranges. In this case, the supply levels are organized according to the voltage range that is used for the transmission of electrical energy, and according to the corresponding distribution function in the energy supply network. Therefore, an energy supply network usually has a high-voltage or transmission level, a medium-voltage or distribution level and low-voltage or final-distribution level.

In an energy supply network of traditional composition, electrical energy that is generated by large generators (as source), such as large hydroelectric power plants, thermal power plants or large wind farms, is fed into the high-voltage level or transmission level and then routed onwards via, e.g., power transformers to the distribution or medium-voltage level. In this case, the transmission level is operated in an extra-high-voltage range or high-voltage range, e.g., in Europe in a voltage range of 60 kV (kilovolts) to 380 kV and higher, and is usually managed centrally by a system operator. At the distribution or medium-voltage level, the electrical energy is usually distributed to regional points, e.g., to transformer stations and/or large entities (consumers), such as factories or hospitals. The distribution level is normally supplied with electrical energy from the hierarchically higher supply level, the transmission or high-voltage level, via substations in a demand-oriented or usage-oriented manner, for example, and is operated in a medium-voltage range (e.g., 1 kV to 60 kV). The final distribution of the electrical energy, in particular to the small end users such as, households or smaller industrial firms, usually takes place at the low-voltage or final-distribution level, a voltage range between approximately 230/400 V or up to 1000 V being used in central Europe. This means that the energy is then transformed from the distribution level to the voltage range of the final-distribution level, and the subscribers or end users connected to the final-distribution level are then supplied with energy. The distribution level or medium-voltage level and the final-distribution level or low-voltage level in an energy supply network of traditional composition are usually jointly managed by, e.g., regional system operators (e.g., regional energy suppliers or regional network operators) in a demand-oriented manner. In other words, electrical energy is obtained as required from the hierarchically higher supply level, in particular the high-voltage or transmission level.

An energy supply network of traditional composition, like many of the energy supply networks in operation today, therefore has a central or hierarchical structure, particularly with respect to operation and management. Here, the required energy is fed in at the highest supply level (the transmission or high-voltage level) and is routed onwards from there to the subsidiary supply levels, i.e., the distribution and final-distribution levels. This means that the energy is always routed from the highest supply level and from one or more central large generators (e.g., hydraulic power plants or thermal power plants) under the control of, e.g., a central system operator to the subsidiary supply levels and the consumers attached thereto, where the subsidiary supply levels (i.e., medium-voltage and low-voltage levels) are managed jointly by one or more system operators. Automated regulation is normally provided at the highest supply level or the transmission level, and the entire energy supply network is controlled by the use or demand at the two lower supply levels (i.e., the distribution level and the final-distribution level), where the energy generation or feed-in at the highest supply level is adapted according to the predicted and/or actual energy demand from the consumer.

Recently, however, attempts to liberalize the energy markets and intensified use of renewable energy resources (e.g., hydraulic power, wind energy or solar radiation) have resulted in the emergence of a multiplicity of smaller energy suppliers that are distributed locally in the energy supply network, e.g., small wind energy installations, small hydraulic power plants or solar or photovoltaic arrays. As a consequence, electrical energy provided by these decentralized energy generators has been fed into the energy supply network at medium-voltage and/or low-voltage level for a number of years. However, this has produced a radical change in the previously normal transmission direction, and a multiplicity of existing decentralized energy generators represents a new challenge for the operation and control of energy supply networks, primarily because many of the central regulating systems previously used in traditional energy supply networks are no longer suitable for operating the energy supply network when decentralized energy generation is included.

Whereas supply difficulties arise due to temporally varying demand for electrical energy by the end users in a traditional energy supply network, an energy supply network that includes decentralized energy generation has further problems in terms of the widely varying availability of electrical energy from decentralized energy generation. This is dependent on the presence of uncontrollable primary sources (e.g., wind or solar radiation), for example, and therefore offers significantly less scope for planning than energy generation using conventional power plants. This direct dependence of the decentralized energy generation on, e.g., current regional weather conditions can result in significant fluctuations in an energy amount that is fed into an energy supply network. As a result of the varying feed-in, significant fluctuations are therefore produced at the supply level, e.g., at the low-voltage level in the case of photovoltaic systems and, e.g., at the low-voltage and/or medium-voltage level in the case of wind power, and these fluctuations must then be monitored at the supply level that is hierarchically higher in each case.

In technical terms, the varying energy feed-in can result in, e.g., sudden excesses or sudden breakdowns of the voltage level in at least parts of the respective supply level, and lead to a varying quality of the energy supply. If more energy is generated than consumed at one of the lower supply levels, there is also a reversal in the flow direction of the energy, and energy from a lower supply level is fed back to a higher supply level. This can result in significant problems with respect to the operational safety and reliability of the energy supply network.

In order to allow simpler control of an entire energy supply network that includes decentralized energy generation, greater reliability of the energy supply, and easier marketing of locally generated energy, the energy amounts provided by decentralized energy generators, said amounts being generally small in comparison with large generators are, e.g., combined to form a virtual power plant. In this case, a virtual power plant (VPP) is a name given to such a combination of a plurality of smaller, decentralized energy generators, such as photovoltaic installations, or small wind energy installations. A control characteristic or overall schedule for a virtual power plant can then be negotiated with the respective network operator, for example, based on predictions relating to future energy demand on the supply side. It is then possible to specify individual schedules, for example, which are applied to regulate the operation of the individual energy generators that are combined in the virtual power plant.

In order to define the overall schedule and the individual schedules, and to control the decentralized energy generators, it is however also necessary to provide a corresponding centralized control and information links to the decentralized energy generators to allow a corresponding information exchange. The European Union supports projects for standardization of control and communication for virtual power plants, e.g. FENIX: Flexible Electricity Network to Integrate the expected 'energy evolution', DISPOWER: Distributed Generation with High Penetration of Renewable Energy Sources, etc. These are intended to allow, e.g., Internet-based control of a virtual power plant and automatic trading of electrical energy. However, virtual power plants have a significant disadvantage in that their centralized control, and the permanent information linking of the decentralized energy generators for this control, involves considerable effort and cost. In particular, each decentralized energy generator must have a continuous information connection to the virtual power plant, and this involves considerable effort and cost for a small operator of a private photovoltaic installation, for example.

SUMMARY OF THE INVENTION

In view of the foregoing, it is an object of the invention to provide a method for operating an entire energy supply network that includes decentralized energy generation, by which method it is possible in a simple manner and without significant effort to operate an energy supply network including decentralized energy generation with a high degree of stability while preserving an existing network topology, and by which method it is simpler for decentralized energy generators to participate in automated trading of electrical energy.

This and other objects and advantages are achieved in accordance with the invention by a method in which each of three supply levels is considered as an independent regulating unit that is connected or disconnected via interfaces between the respective regulating units as required. Each of the regulating units is assigned its own operator region, where only the respective regulating unit or corresponding supply level is controlled by each operator region. This means that energy feed-in by generators and energy consumption by consumers is combined and controlled in the respective operator region. An exchange of energy amounts between the regulating units is then supervised by the associated operator region in each case, via the interface between the respective regulating units, by controlling parameters that are defined between the respective regulating units.

The main aspect of the solution proposed by the invention consists in considering the energy supply network in its entirety. With reference to published patent application submitted by the applicant and having the PCT application number PCT/EP2012/071461, which describes a method for regulating an energy supply network, the supply levels are seen as independent regulating units. Furthermore, the supply levels and the energy generating entities attached to these supply levels in each case, e.g., large power plants at the transmission level, smaller hydroelectric or wind power plants at the distribution level, or photovoltaic installations connected via, e.g., converters at the final-distribution level, are combined in an individual operator region and assigned to the regulating unit corresponding to the respective supply level. Therefore, each supply level of the energy supply network is considered not only as an independent regulating unit, but also as an independent operator region with its energy generation and its energy demand.

In accordance with the method of the invention, the energy supply network is represented as a set of automated supply networks that can be viewed as component parts in a chain of networks. These component parts are controlled and supervised by an independent operator region and are able to establish connections to each other in a flexible and reliable manner, in order that they can interact and, e.g., exchange energy. All operator regions have the same tasks in this case, i.e., developing, operating and maintaining an efficient and flexible energy system, and providing energy generators with simple access for energy feed-in at each supply level. A middle or second operator region assigned to a middle or second supply level has a central strategic position in particular, because it has supply level interfaces to both of the other supply levels and this operator region must therefore interact with both of the other operator regions.

Each individual supply level or the associated operator region is operated, controlled and supervised independently of the other supply levels or operator regions, where, e.g., agreements may exist between the operator regions with regard to coordinated operation, in particular energy flows between the operator regions. Specifications and/or agreements with connected energy generators or energy generating entities, for example, may also exist in each operator region for the purpose of regulating, supervising and controlling, such as energy feed-in, energy demand or energy consumption, in order to ensure stability of the voltage range in the respective operator region.

In a simple manner and without significant effort (e.g., for network modifications, large volumes of processing data or additional control entities), the method in accordance with the invention allows integration of decentralized energy generation at every supply level without significant changes to the structure of the energy supply network, and simple access to automated energy trading for energy generators providing decentralized feed-in. This also ensures more efficient and more secure operation, and flexible dynamic control of the energy supply network and its supply levels, since is it possible to react very easily and efficiently to various events, such as overload or excessive feed-in at a supply level, virtually in real time.

In this case, it is advantageous to maintain a specified voltage range in each operator region and in the associated regulating unit. One of the most important tasks for an operator or within an operator region in the energy supply network is to ensure that the respective voltage range (e.g., high voltage, medium voltage or low voltage of the respective supply level) remains within the specified voltage range as far as possible, in order that stable and secure operation and a corresponding quality of the energy supply can be guaranteed. Moreover, the voltage ranges for the respective supply levels are specified by, e.g., various international and/or national standards. These voltage ranges are therefore very easily monitored and supervised for the respective regulating unit by the corresponding associated operator region, in order to ensure that the respective regulating unit responds to any fluctuation in consumption and/or feed-in of electrical energy.

When regulating an individual regulating unit and the associated operator region, it is also advantageous to apply a primary regulation, a secondary regulation and a tertiary regulation. By virtue of the inventive method, each supply level is considered as an independent regulating unit and an independent operator region. This means that the control, supervision and regulation of the operator region is restricted to the respective regulating element or the respective supply level. In this case, each supply level of the energy supply network has the same regulating model, and variations between feed-in and withdrawal or consumption of electrical energy are balanced out within the respective operator region itself in the short term. The withdrawal of energy (e.g., by energy storage such as charging energy stores) is increased or reduced in the respective regulating unit for this purpose. If the variation cannot be balanced out in the regulating unit itself, energy can be obtained from another regulating element or from a higher or lower supply level, such as via the respective interface under the control of the operator region, or discharged to these in the event of an energy surplus, for example.

In the context of the primary regulation, in particular imbalances between energy availability and energy demand within the respective supply level or in the respective regulating unit are balanced out by the associated operator region. In other words, the respective generators of the respective supply level are regulated accordingly. At a first supply level or transmission level, for example, these are the large energy generators (e.g., large hydraulic power plants or thermal power plants). At a second supply level or distribution level, for example, the decentralized energy generators (e.g., small hydraulic power plants or wind power installation) from which energy is fed in at this level are regulated as an object of the primary regulation. At a third supply level or low-voltage level, the primary regulation is concerned with customer installations, such as private photovoltaic installations. The objective of the primary regulation is usually to produce a stable network frequency.

In the context of the secondary regulation, at every supply level or within every regulating unit, the associated operator region strives to reestablish the balance between energy availability and energy demand following the occurrence of a difference in this regulating unit. Unlike the primary regulation, the operator region considers the situation within the respective regulating unit including an exchange of energy with the other regulating units in this case. For this purpose, the flows of power (effective and reactive power) at the respective interfaces between the regulating units are then considered. By monitoring the network frequency, for example, it is ensured that primary and secondary regulation always work in an identical flow direction in this case.

In the context of the tertiary regulation or minute reserve, reserves of energy or current are likewise made available in or for the respective regulating unit, in particular following a corresponding request. It is possible to differentiate between positive and negative regulating energy in this case. A positive minute reserve or regulating energy is used to provide a cushion against any underproduction of energy in the respective regulating element. A negative minute reserve or regulating energy usually refers to that capacity required for storing or retaining energy when there is too much energy and too little demand in the respective regulating unit.

In this case, in addition to exchanging energy amounts between the respective operator regions, it is also advantageous to exchange operator data for the purpose of regulating and controlling the respective regulating unit and the associated operator region. This operator data may comprise, e.g., technical data and information which has been, e.g. contractually negotiated and agreed in advance between operator regions, e.g., energy amounts to be exchanged such as the minute reserve for the tertiary regulation. This operator data may be used in a planning phase for each operator region, for example, for the purpose of estimating energy that is required to be generated by the respective operator region, or may very easily be used for the purpose of planning and/or regulating applications of the respective operator region.

In a further embodiment of the inventive method, it is advantageous to use effective power, reactive power or the power factor cos $\Phi$ as parameters between the operator regions and the associated regulating units. It is thus possible to limit transmission and analysis of regulating values between the regulating units or supply levels for the purpose of corresponding control, and the amount of data and information to be analyzed and supervised by the operator region is therefore small and very easy to organize. In a conventional distribution entity in a European energy supply network, e.g. up to 500 data or regulating values are exchanged between transmission level and distribution level, e.g., in order to maintain the voltage within the ranges that are specified in each case for the respective regulating unit (e.g., transmission level, distribution level). By controlling these parameters, effective power and reactive power in particular, it is moreover possible very easily and quickly to effect a connection and/or disconnection of the independent regulating unit in each case, such as for the purpose of exchanging energy.

It is also advantageous to provide a high-voltage or transmission level as the first level of the three supply levels. A medium-voltage or distribution level can be provided as the second level of the three supply levels, and a low-voltage or final-distribution level as the third level of the three supply levels. These supply levels are normally present in energy supply networks, and are ideally considered by the inventive method not only as independent regulating units, but also as independently controlled operator regions. Here, each supply level is seen by the other supply levels as a "black box". Interaction between the respective supply levels occurs very simply via the respective interface by controlling the effective and reactive power accordingly, where the effective and reactive power can be transmitted in both directions. In order to allow corresponding interaction between the operator regions associated with the respective supply levels, coordination of their respective operation can also be defined on a technical and/or economic level based on contractual agreements. In this way, it is possible to define arrangements between the high-voltage level or the corresponding operating range of the high-voltage level and the operating range of the medium-voltage level, and between the operating range of the medium-voltage level and the operating range of the low-voltage level. In particular, the operating range of the medium-voltage level has a particular function and a strategic position in this case, because it is coordinated with and also has contractual arrangements with both of the other supply levels. In particular, the operator region of the medium-voltage level can therefore significantly influence dynamic system supervision of the entire energy supply network.

It is also appropriate for interfaces to subscribers or groups of subscribers at the second and third supply level to be controlled by the associated operator region, said interfaces being used by the subscribers or groups of subscribers to withdraw energy and by at least some of the subscribers or groups of subscribers to feed energy directly into the respective operator region, particularly by photovoltaic systems and/or wind power. In this way, all subscribers and in particular the smaller and small energy generators, including "prosumers", who are connected to a respective network at the respective second and/or third supply level, can be given much easier access to an energy market and energy trading. The term prosumer is a combination of the words "producer" and "consumer" and denotes a consumer or subscriber to the energy supply network, who is also a producer of energy at the same time, e.g. a private household in which a photovoltaic installation is operated and in which therefore more energy is occasionally or regularly produced than used.

The method in accordance with the invention is intended to ensure that an energy amount that is generated by all energy generators, irrespective of their size and position in the energy supply network, can be fed into the energy supply network and made available for energy trading. Here, a plurality of smaller energy generators at the respective supply level or in the respective operator region, for example, can also be combined to form groups, such as a virtual power plant, which is then adjusted by the respective operator level. For example, this is particularly advantageous if energy generators of the same type (e.g., a plurality of photovoltaic installations or a plurality of smaller wind energy generators) are combined to form a group or a virtual power plant, because these will have similar or identical characteristics, parameters and control data. Moreover, a combination of a plurality of smaller energy generators with adjustment via interfaces by the respective operator region has the advantage that e.g. fluctuations in the energy feed-in from the individual energy generators (e.g. due to wind variations or variations in the solar radiation) can be balanced out more effectively and more easily in the respective regulating element or at the respective supply levels. A comparatively larger amount of energy can then be controlled via the interface than is possible when individual subscribers or energy generators are activated.

Other objects and features of the present invention will become apparent from the following detailed description considered in conjunction with the accompanying drawings. it is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below in exemplary form with reference to the appended figures in which.

DETAILED DESCRIPTION OF THE EXEMPLARY EMBODIMENTS

Figure 1:
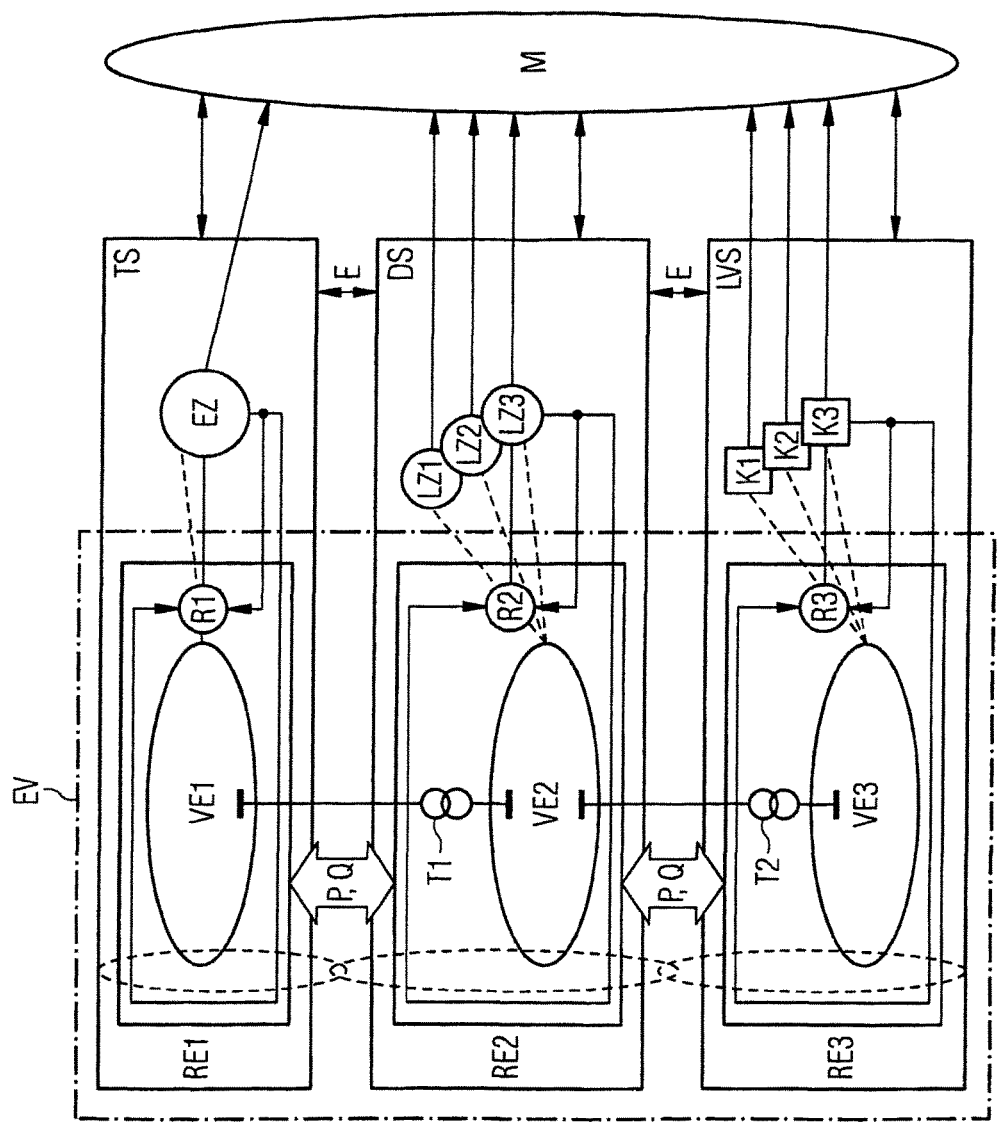
FIG. 1 schematically shows an exemplary energy supply network in which the method for operating an entire energy supply network in accordance with the invention is applied and where energy generation is decentralized.

FIG. 1 schematically shows an exemplary energy supply network EV. The energy supply network EV has three supply levels VE1, VE2, VE3. In this case, a high-voltage or transmission level is provided as a highest or first supply level VE1. A second or middle supply level VE2 is formed as a medium-voltage or distribution level, and a low-voltage or final-distribution level is provided as a third or lowest supply level.

At each of these three supply levels VE1, VE2, VE3, energy in the respective supply level VE1, VE2, VE3 is fed into the energy supply network EV in a decentralized manner via respective exemplary energy generators EZ, LZ1, LZ2, LZ3, K1, K2, K3. At the first supply level or transmission level VE1, energy generated by large energy generators EZ, such as large hydraulic power plants, thermal power plants or large wind parks, is fed into the energy supply network. At the second supply level or distribution level VE2, in addition to larger consumers (e.g., factories or hospitals), regional or local energy generators LZ1, LZ2, LZ3, such as small hydraulic power plants or wind parks can also be attached as subscribers LZ1, LZ2, LZ3. Decentrally generated energy is then fed into the energy supply network by these regional or local energy generators LZ1, LZ2, LZ3. At the lowest supply level or final-distribution level VE3, subscribers K1, K2, K3, usually comprising private households or smaller industrial firms, are attached to the energy supply network EV as consumers. Energy can again be fed into the energy supply network EV by at least some of these subscribers K1, K2, K3 as "prosumers". These subscribers K1, K2, K3, which are attached to the third supply level VE3 or to final-distribution networks or local networks, can generate and feed energy back in by e.g., photovoltaic installations or small wind energy installations.

Furthermore, each supply level VE1, VE2, VE3 has a specified voltage range that must be maintained despite decentralized energy feed-in and fluctuations in energy demand and energy production. Here, the first supply level VE1 operates in an extra-high-voltage and high-voltage range (e.g., 60 kV to 380 kV and possibly even higher). A medium-voltage range (e.g., 1 kV to 60 kV) may be maintained at the second distribution level VE2. For final distribution of the energy, the third supply level VE3 may use a low-voltage range between approximately 230/400 V.

Corresponding transformation stations T1, T2 are therefore provided for voltage conversion of the energy between the supply levels VE1, VE2, VE3. For example, the second supply level VE2 has a first transformation station T1 (e.g., substation) for this purpose. A second transformation station (e.g., transformer) is provided at the third supply level VE3 for this purpose.

When applying the method in accordance with the invention, each of the three supply levels VE1, VE2, VE3 is considered as an independent regulating unit RE1, RE2, RE3. These regulating units RE1, RE2, RE3 are regulated independently of each other. The regulating units RE1, RE2, RE3 may be disconnected or connected as required via interfaces between the respective regulating units RE1, RE2, RE3. These interfaces are defined by controlling an effective and reactive power P, Q between the respective regulating units RE1, RE2, RE3. In the case of exemplary energy supply network EV, an interface is therefore defined by controlling the effective power P and the reactive power Q between the first and the second regulating units RE1, RE2, and therefore between the transmission level VE1 and the distribution level VE2. Furthermore, an interface is also formed by controlling effective power P and reactive power Q between the second and third regulating units RE2, RE3, i.e., the distribution level VE2 and the final-distribution level VE3. Consequently, the supply levels VE1, VE2, VE3 and the regulating units RE1, RE2, RE3 can interact as component parts of a chain in a flexible manner by controlling the effective power P and the reactive power Q at the respective interfaces, where the second regulating unit RE2 or the distribution level VE2 can be seen as a central strategic component of the chain by virtue of its position, having interfaces to both of the other supply levels VE1, VE2. In this case, the respective regulating unit RE1, RE2, RE3 represents a "black box" for the other regulating units RE1, RE2, RE3, and very few data or regulating values are exchanged via the interface between the regulating units RE1, RE2, RE3. For example, only values for the effective power P and/or the reactive power Q and/or a value for the power factor cos Φ are exchanged between the first regulating unit RE1 or the transmission level VE1 and the second regulating unit RE2 or the distribution level VE2, e.g., for the purpose of maintaining voltage ranges that are specified for the supply level VE1, VE2.

In accordance with the method of the invention, each of the three supply levels VE1, VE2, VE3 or the associated regulating units RE1, RE2, RE3 is assigned its own operator region TS, DS, LVS. Here, the respective operator region TS, DS, LVS encompasses and independently operates the respective regulating unit RE1, RE2, RE3 and the corresponding associated supply level VE1, VE2, VE3. The respective operator region combines and controls any energy consumption and energy feed-in for the respective regulating unit RE1, RE2, RE3. This means that a first operator region TS consists of, e.g., the first regulating unit RE1 and the energy generators EZ (e.g., large hydraulic power plants or thermal power plants) that are attached to the first supply level VE1, and supervises the energy generation and/or feed-in at the first supply level in this case. A second operator region DS encompasses, e.g., the second supply level VE2, the second regulating element RE2, the energy generators LZ1, LZ2, LZ3, such as local or regional energy generators (e.g., small hydraulic power plants or wind energy installations), and consumers such as industrial firms or hospitals that are attached to the second supply level VE2. The second operator region DS combines and controls the energy consumption and energy feed-in to the second regulating unit RE2. A third operator region consists of the third supply level VE3 and the subscribers K1, K2, K3 that are attached to this supply level VE3 or this regulating element RE3. These subscribers K1, K2, K3 are consumers such as private households or small firms, at least some of whom may also be energy producers such as private households operating photovoltaic installations or smaller firms with, e.g., photovoltaic or wind energy installations. These "prosumers" K1, K2, K3 not only obtain energy from the energy supply network EV, but also feed energy in with, e.g., weather-dependent fluctuation in some cases. The third operator region LVS therefore combines, supervises and controls the energy consumption and energy generation of the third regulating unit RE3.

Furthermore, the operator regions TS, DS, LVS also supervise and control an exchange of energy amounts E between the respective regulating units RE1, RE2, RE3 via the corresponding interfaces between the regulating units RE1, RE2, RE3, by controlling parameters that are defined between the regulating units RE1, RE2, RE3, in particular the effective power P, the reactive power Q or the power factor cos Φ. By controlling these defined parameters, the regulating units RE1, RE2, RE3 can interact in a flexible manner via the respective interfaces like component parts in a chain of networks, and therefore the regulating units RE1, RE2, RE3 can be connected as required for the purpose of energy exchange E between the operator regions TS, DS, LVS, and disconnected when such an energy exchange E is not required. In other words, the energy required in each case is produced locally by each regulating unit RE1, RE2, RE3 without generating any surplus, and therefore the voltage range that is specified in each case for the regulating unit RE1, RE2, RE3 or the associated operator region TS, DS, LVS is maintained.

Each regulating unit RE1, RE2, RE3 has the same regulating model R1, R2, R3 in this case, and each operator region has the same task of operating the corresponding regulating unit RE1, RE2, RE3 in an efficient and stable manner, and offering the respective energy generators EZ, LZ1, LZ2, LZ3, K1, K2, K3 simple access for the energy feed-in and to an energy market M. In order to regulate the respective regulating units RE1, RE2, RE3 correspondingly, "primary regulation", "secondary regulation" and "tertiary regulation" are used in the respective operator regions TS, DS, LVS. The regulation R1, R2, R3 therefore relates to different objects at the respective supply level VE1, VE2, VE3, and different objects relating to the energy generation must be controlled and supervised by the respective operator region TS, DS, LVS.

Furthermore, in addition to the exchange of energy amounts E between the respective operator regions TS, DS, LVS, e.g., between the first operator region TS and the second operator region DS and between the second operator region DS and the third operator region LVS, operator data and information are exchanged for the regulation and control of the respective regulating unit RE1, RE2, RE3. This operator data and/or its contents may be contractually agreed between the operator regions TS, DS, LVS, for example, and exchanged beforehand in or during a planning phase, for example. Such operator data comprises, e.g., energy amount reserves for the tertiary regulation ("minute reserves"), which are made available by one operator region TS, DS, LVS to another if required. Operator data can also be used for automated exchange of information relating to, e.g., planning data or usage estimates.

At the first supply level VE1, the first operator region TS controls the large energy generators EZ in particular, and supervises and manages the first regulating unit RE1. At the second supply level VE2, the second operator region DS is primarily concerned with controlling and supervising the decentralized (regional and/or local) energy generators LZ1, LZ2, LZ3, particularly in the context of the primary regulation. At the third supply level VE3, energy is generated and fed in, e.g., by private generators K1, K2, K3. Therefore, these subscribers and/or customer installations K1, K2, K3 (e.g. photovoltaic systems) in particular must be supervised and controlled accordingly at the third supply level VE3 by the third operator region LVS, e.g., in order to balance out any fluctuation in the feed-in. In order to allow improved management by the operator region DS, LVS at the second and third supply level VE2, VE3, for example, interfaces to the subscribers and/or energy generators LZ1, LZ2, LZ3, K1, K2, K3 or to groups of subscribers and/or energy generators LZ1, LZ2, LZ3, K1, K2, K3, via which energy is obtained and in particular fed into the supply level VE2, VE3, may be controlled by the respective operator region DS, LVS.

By virtue of the inventive method, e.g., if an energy deficit (i.e., the consumption is greater than the production) or an energy surplus (i.e., the production is greater than the consumption) is present in an operator region, energy E can be exchanged as required between the operator regions TS, DS, LVS in order to regulate the associated regulating unit RE1, RE2, RE3, e.g., based on agreements between the operator regions TS, DS, LVS. The respective operator region TS, DS, LVS can then satisfy demand by means of the energy market M, or make energy available to the energy market M. For example, the first operator region TS and the second operator region DS may enter into an agreement in this way. The second operator region DS may have a corresponding agreement and definition of an energy exchange E with the third operator region LVS. The second operator region DS therefore occupies a strategic position, because it is able to influence an energy exchange E with both the first and the third operator region TS, LVS.

It is also possible for the energy generators to make the energy they produce available to the energy market M directly, in particular by the interfaces to the respective energy generators LZ1, LZ2, LZ3, K1, K2, K3, where the interfaces are controlled by the operator regions DS, LVS. For the purpose of simplification and better control, the energy generators LZ1, LZ2, LZ3, K1, K2, K3 of the second and/or third supply level VE2, VE3 can be combined into groups or virtual power plants in this case. It is then easier for the respective operator region DS, LVS to supervise and regulate fluctuations in the energy production and feed-in.

In order to regulate the energy exchange E between the operator regions TS, DS, LVS and to ensure secure and stable operation of the energy supply network EV, the control of the parameters that define the interfaces between the regulating units RE1, RE2, RE3, in particular effective power P and reactive power Q, allows micro-grids or stand-alone networks to be created and/or reintegrated into the energy supply network EV very easily. This means that, e.g., energy generation in one operator region TS, DS, LVS is available or unavailable to the other operator regions TS, DS, LVS. For example, the second regulating unit RE2 or the second supply level VE2 and the third regulating unit RE3 may be jointly decoupled (temporarily) from the first regulating unit RE1 or the transmission level VE1, e.g., because the regional or local generators LZ1, LZ2, LZ3 and/or the prosumers K1, K2, K3 of the third supply level are producing sufficient energy to satisfy the demand of the second and third supply levels VE2, VE3.

However, if the energy generation of the second and third supply levels VE2, VE3 is no longer sufficient to satisfy the energy demand, the second regulating unit RE2 may be reconnected to the first regulating unit RE1, by a corresponding control or request from the second operator region DS, in order to effect an energy exchange E between the operator levels TS, DS.

In order to effect the decoupling, e.g., a transmission of the effective power P and the reactive power Q via the interface between the first and the second regulating unit RE1, RE2 is reduced to zero. The first and second supply levels VE1, VE2 are still synchronized in this case, but no more power P, Q is transmitted between them and there is no longer an energy exchange E between the operator regions TS, DS. Once the corresponding first transformation station T1 has been disconnected, the two supply levels VE1, VE2 or the two regulating units RE1, RE2 are then separated from each other. The second regulating unit is then operated as a micro-grid or standalone network.

In order to reconnect the second regulating unit RE2 to the first regulating unit RE1 or the transmission level VE1, e.g., because the second operator region DS detects that the energy demand can no longer be satisfied locally/regionally, provision is first made for synchronizing the first regulating unit RE1 with the second regulating unit RE2, which is to be connected. The effective power P and reactive power Q to be transmitted between the regulating units RE1, RE2 is then increased, such that power P, Q can be exchanged between the regulating units RE1, RE2 again and energy E can be re-exchanged between the operator regions TS, DS.

In accordance with the method of the invention, an energy supply network EV is provided as a type of energy supply network chain, where the individual regulating units RE1, RE2, RE3 or component parts of the chain are able to interact in a simple and flexible manner, and where the interaction, the energy exchange, and the management of the regulating units RE1, RE2, RE3, are controlled, supervised and coordinated, e.g., based on contractual and technical agreements, by the corresponding associated operator region TS, DS, LVS. As a result, decentralized energy generators LZ1, LZ2, LZ3, K1, K2, K3 can very easily be integrated into an existing energy supply network EV without great effort, and the energy that is produced can very easily be made available for automated trading in an energy market M.

Figure 2:
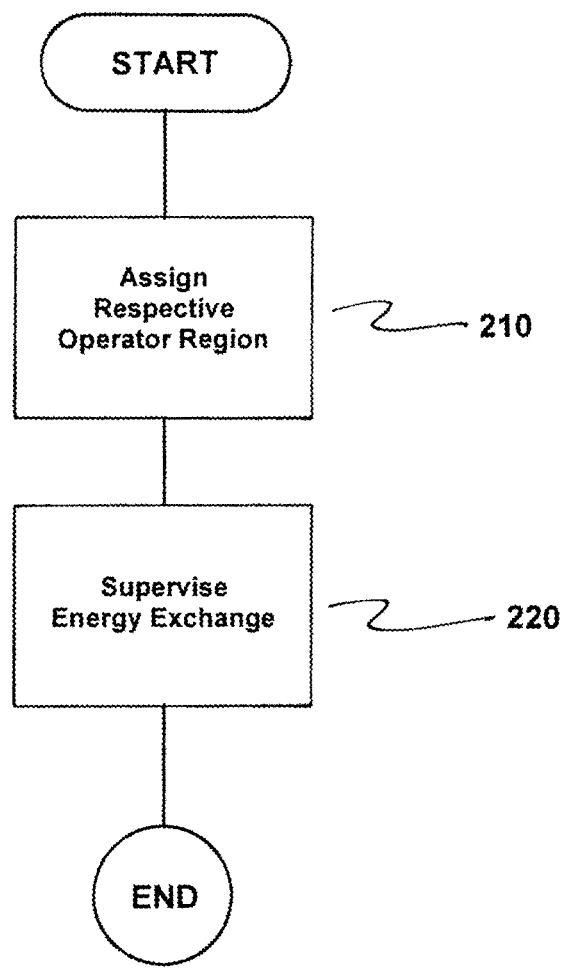
FIG. 2 is a flowchart of the method in accordance with the invention.

FIG. 2 is a flowchart of the method for operating an entire energy supply network (EV) having three supply levels (VE1, VE2, VE3), where energy is generated and fed into each supply level (VE1, VE2, VE3) by producers (EZ, LZ1, LZ2, LZ3, K1, K2, K3). Each of the three supply levels (VE1, VE2, VE3) comprises an independent regulating unit (RE1, RE2, RE3) that is connected or disconnected via interfaces between respective regulating units (RE1, RE2, RE3) as required.

The method comprises assigning a respective operator region (TS, DS, LVS) to each of the regulating units (RE1, RE2, RE3), as indicated in step 210. Here, energy feed-in and energy consumption in the respective regulating units (RE1, RE2, RE3) is combined and controlled in the respective operator region (TS, DS, LVS).

An exchange of energy amounts (E) between the respective regulating units (RE1, RE2, RE3) is then supervised by each associated operator region (TS, DS, LVS), via an interface between the respective regulating units (RE1, RE2, RE3), by controlling parameters that are defined between the respective regulating units (RE1, RE2, RE3), as indicated in step 220.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an entire single energy supply network system having three supply levels, energy being generated and fed into each supply level by producers, the method comprising:
   configuring each of the three supply levels of the single energy supply network system as an independent regulating unit which is connected or disconnected via interfaces between respective regulating units as required;
   assigning a respective operator region to each of the regulating units, energy feed-in by producers and energy consumption by consumer loads of a respective supply level being combined and a respective regulating unit being controlled by the respective operator region; and
   controlling an exchange of energy amounts between respective regulating units by each associated operator region, via an interface between the respective regulating units, by controlling parameters defined between the respective regulating units.

2. The method as claimed in claim 1, wherein a specified voltage range is maintained in each operator region and an associated regulating unit.

3. The method as claimed in claim 2, wherein a primary regulation, a secondary regulation and a tertiary regulation are used to regulate an individual regulating unit and each associated operator region.

4. The method as claimed in claim 2, wherein in addition to an exchange of energy amounts between the respective operator regions, operator data for regulation and control of a respective regulating unit and each associated operator region is also exchanged.

5. The method as claimed in claim 1, wherein a primary regulation, a secondary regulation and a tertiary regulation are used to regulate an individual regulating unit and each associated operator region.

6. The method as claimed in claim 5, wherein in addition to an exchange of energy amounts between the respective operator regions, operator data for regulation and control of a respective regulating unit and each associated operator region is also exchanged.

7. The method as claimed in claim 1, wherein in addition to an exchange of energy amounts between the respective operator regions, operator data for regulation and control of a respective regulating unit and each associated operator region is also exchanged.

8. The method as claimed in claim 1, wherein at least one of (i) effective power, (ii) reactive power and (iii) a power factor cos $\Phi$ are used as parameters between each associated operator region and the respective regulating units.

9. The method as claimed in claim 1, wherein a high-voltage or transmission level is provided as a first level of the three supply levels, a medium-voltage or distribution level is provided as a second level of the three supply levels, and a low-voltage level is provided as a third level of the three supply levels.

10. The method as claimed in claim 1, wherein interfaces to subscribers or groups of subscribers at the second and third supply levels are controlled by the associated operator region, said interfaces to subscribers being used by the subscribers or subscriber groups to withdraw energy and by at least some of the subscribers or subscriber groups to feed energy directly into the respective operator region, particularly by means of photovoltaic systems and/or wind power.

11. The method as claimed in claim 1, wherein the energy feed directly into the respective operator region is via at least one of photovoltaic systems and/or wind power.

\* \* \* \* \*